(12) United States Patent
Lee

(10) Patent No.: US 10,403,231 B2
(45) Date of Patent: Sep. 3, 2019

(54) DISPLAY DEVICE AND CONTROL METHOD THEREOF

(71) Applicants: HKC Corporation Limited, Shenzhen, Guangdong (CN); Chongqing HKC Optoelectronics Technology Co., Limited, Chongqing (CN)

(72) Inventor: Chia-Hang Lee, Chongqing (CN)

(73) Assignees: HKC CORPORATION LIMITIED, Shenzhen, Guangdong (CN); CHONGQING HKC OPTOELECTRONICS TECHNOLOGY CO., LTD., Chongqing (CN)

(\*) Notice: Subject to any disclaimer, the term of this patent is extended or adjusted under 35 U.S.C. 154(b) by 0 days.

(21) Appl. No.: 15/580,111

(22) PCT Filed: Sep. 4, 2017

(86) PCT No.: PCT/CN2017/100327
§ 371 (c)(1),
(2) Date: Dec. 6, 2017

(87) PCT Pub. No.: WO2019/019262
PCT Pub. Date: Jan. 31, 2019

(65) Prior Publication Data
US 2019/0035360 A1   Jan. 31, 2019

(51) Int. Cl.
*G09G 5/10* (2006.01)
*G06K 9/00* (2006.01)

(52) U.S. Cl.
CPC ............. *G09G 5/10* (2013.01); *G06K 9/0061* (2013.01); *G06K 9/00604* (2013.01);
(Continued)

(58) Field of Classification Search
CPC ............... G09G 5/10; G09G 2354/00; G09G 2320/0626; G09G 2320/08; G06K 9/00604

See application file for complete search history.

(56) References Cited

U.S. PATENT DOCUMENTS

| 2011/0181541 A1 | 7/2011 | Kuo | |
| 2015/0015460 A1* | 1/2015 | Kobayashi | G02B 27/017 345/8 |
| 2017/0263192 A1* | 9/2017 | Luna | G09G 3/3406 |

FOREIGN PATENT DOCUMENTS

| CN | 103218990 A | 7/2013 |
| CN | 103325358 A | 9/2013 |

(Continued)

OTHER PUBLICATIONS

International Search Report and Written Opinion in corresponding PCT application PCT/CN2017/100327, dated Apr. 20, 2018, 9 pp. in Chinese.

*Primary Examiner* — Tapas Mazumder
(74) *Attorney, Agent, or Firm* — Juan Carlos A. Marquez; Marquez IP Law Office, PLLC

(57) ABSTRACT

This application provides a display device and a control method thereof. The control method includes the following steps: obtaining, by using an image sensor module, a target image; analyzing, by using a pupil computing module, first data of the target image; and controlling, by using a processing module according to the obtained first data of the target image, a light emitting module to adjust luminance of a display panel.

6 Claims, 4 Drawing Sheets

(52) U.S. Cl.
CPC . *G09G 2320/0626* (2013.01); *G09G 2320/08* (2013.01); *G09G 2354/00* (2013.01)

(56) References Cited

FOREIGN PATENT DOCUMENTS

| | | |
|---|---|---|
| CN | 103327172 A | 9/2013 |
| CN | 105516446 A | 4/2016 |
| JP | 2007316492 | 12/2007 |

* cited by examiner

DISPLAY DEVICE AND CONTROL METHOD THEREOF

BACKGROUND

Technical Field

This application relates to a field of display technologies, and specifically, to a display device and a control method thereof.

Related Art

With gradually wide application of display devices, users spend more time in looking at the display devices, including mobile phones, monitors, notebook computers, Pads, and television. Even some smart watches use LCD or OLED as display components. However, more users look at display devices for a long term. Warnings are given in some medical documents and by medical professionals for a wavelength of blue light emitted by the existing display devices. If the eyes are exposed to the short-wave band blue light display device for a long time, the eyes may be harmed, and even, people may become blind in a serious case.

Therefore, regardless of whether a blue light LED chip is used as a LCD display device of a backlight source, or an OLED blue light display unit is used as the display device, harm caused by the blue light to the eyes needs to be considered during design. A current technology of inhibiting the blue light in the display devices mainly includes the following manners. In a first manner, a high-transmittance film having a function of filtering out a blue light wavelength is added in the front of a display screen. In this way, filtering may be performed for a special blue light wavelength, thereby reducing harm caused to the eyes. In the other design manner, a spectrum of a LCD backlight source is adjusted, and especially, a wavelength of an LED blue light chip is displaced, to achieve an objective of reducing energy of the blue light. When we use the film technology of filtering out a blue light or adjust the wavelength of the LED blue light chip to reduce the harm caused to the eyes, an entire display image may be yellowish due to a lack of the color of the blue light, leading to serious distortion of the image. Therefore, in an anti-blue light technology, how to reduce intensity of the blue light while maintaining the color of an image is a very important issue.

SUMMARY

In view of the disadvantages of the related art, this application provides a display device and a control method thereof, thereby achieving an effect of reducing intensity of the blue light and protecting the eyes.

The objective of this application and the solution to the technical problems may be implemented by using, the following technical measurements.

This application provides a display device, including: a display panel; a light emitting module, configured to adjust a luminance of the display panel; an image sensor module, configured to obtain a target image; a pupil computing module, connected to the image sensor module, to analyze first data of the target image; and a processing module, connected to the pupil computing module and the light emitting module, configured to adjust the luminance of the display panel according to the obtained first data of the target image.

The processing module is configured to input the first data to an algorithm logic, to compute a luminance setting parameter value, and adjust the luminance of the display panel according to the luminance setting parameter value, where the algorithm logic includes a logic relationship among values of the first data, an amount of light incident to the pupils, and a luminance.

The processing module is configured to find a luminance value corresponding to the first data according to a luminance correspondence table, and adjust the luminance of the display panel according to the luminance value.

When the first data computed by the pupil computing module is less than a specified value, a maintenance instruction is generated, and the processing module controls, according to the maintenance instruction, the light emitting module to maintain the luminance of the display panel.

The objective of this application and the solution to the technical problems may be further implemented by using the following technical solutions.

This application provides a control method of a display device. The control method includes the following steps: obtaining, by using an image sensor module, a target image; analyzing, by using a pupil computing module, first data of the target image; and controlling, by using a processing module according to the obtained first data of the target image, a light emitting module to adjust a luminance of a display panel.

A step of the controlling, by using a processing module according to the obtained first data of the target image, a light emitting module to adjust a luminance of a display panel further includes: inputting, by using the processing module, the first data to an algorithm logic, to compute a luminance setting parameter value, and adjusting the luminance of the display panel according to the luminance setting parameter value, where the algorithm logic includes a logic relationship among values of the first data, an amount of light incident to the pupils, and, a luminance.

A step of the controlling, by using a processing module according to the obtained first data of the target image, a light emitting module to adjust a luminance of a display panel further includes: finding, by using the processing module according to a luminance correspondence table, a luminance value corresponding to the first data, and adjusting, according to the luminance value, the luminance of the display panel.

The method further includes: when the first data computed by the pupil computing module is less than a specified value, generating a maintenance instruction, and controlling, by using the processing module according to the maintenance instruction, the light emitting module to maintain the luminance of the display panel.

The method further includes: when the first data computed by the pupil computing module is not less than a specified value and increases gradually, generating a first instruction, and controlling, by using the processing module according to the first instruction, the light emitting module to decrease the luminance of the display panel; or when the first data computed by the pupil computing module is not less than a specified value and decreases gradually, generating a second instruction, and controlling, by using the processing module according to the second instruction, the light emitting module to increase the luminance of the display panel.

This application provides a display device of another objective, including: a display panel; a light emitting module, configured to adjust a luminance of the display panel; an image sensor module, configured to obtain a target image; a pupil computing module, connected to the image sensor module, to analyze first data of the target image; a processing module, connected to the pupil computing module and the light emitting module, configured to adjust the luminance of the display panel according to the obtained first data of the target image, where when the first data computed by the pupil computing module is not less than a specified value and increases gradually, a first instruction is generated, and the processing module controls, according to the first instruction, the light emitting module to decrease the luminance of the display panel; or when the first data computed by the pupil computing module is not less than a specified value and decreases gradually, a second instruction is generated, and the processing module controls, according to the second instruction, the light emitting module to increase the luminance of the display panel.

By means of the foregoing technical solutions and measurements, in this application, pupil sizes of the eyes needing to be adjusted in different environments may be computed precisely by using an algorithm, and amounts of light incident to the eyes are computed based on the pupil sizes, so as to automatically adjust a luminance of a display device, thereby achieving an effect of protecting the eyes by reducing intensity of the blue light. At the same time, an entire display image is not yellowish even in lack of the color of the blue light, the color of the image can be maintained, and quality of the display image is not, affected.

DETAILED DESCRIPTION

To further describe technical means used in a display device and a control method thereof in this application to achieve a predetermined application objective, and an achieved effect, the following further describes, in detail with reference to the accompanying drawings and preferred embodiments, specific implementations, structures, features, and effects of the display device and the control method thereof in this application.

Figure 1:
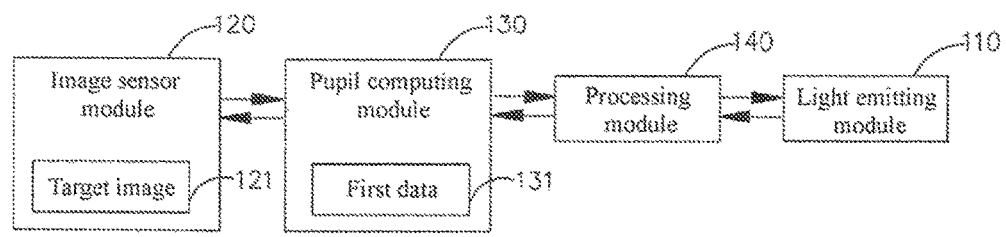
FIG. 1 is a schematic diagram of modules of a display device according to this application.

Referring to FIG. 1, FIG. 1 is a schematic diagram of modules of a display device according to this application.

In FIG. 1, the display device in this application includes: a light emitting module 110, configured to adjust a luminance of a display panel; an image sensor module 120, configured to obtain a target image 121; a pupil computing module 130, connected to the image sensor module 120, to analyze first data 131 of the target image 121; and a processing module 140, connected to the pupil computing module 130 and the light emitting module 110, configured to adjust the luminance of the display panel according to the obtained first data 131 of the target image.

In an embodiment, the eyes may automatically adjust sizes of the pupils in different ambient luminance, to control intensity of ambient light entering the eyes. When the ambient luminance is too high, the pupils may contract to limit an amount of light incident to the eyes. On the contrary, when the ambient luminance is too low, the pupils may dilate to obtain a larger amount of light. Therefore, under the same luminance of the display device, relatively great harm is caused to the eyes by the blue light in the display device when people are in a dark environment. Therefore, a method for adjusting intensity of the blue light in a display device according to the pupil size of the eyes. In addition, the method is not affected by other ambient luminance.

In an embodiment, resolution of the image sensor module 120 needs to be relatively high, and usually, is at a level of ten megapixels, so that it can clearly recognize images of the eyes.

In an embodiment, the processing module 140 is further configured to input the first data 131 to an algorithm logic, to compute a luminance setting parameter value, and adjust the luminance of the display panel according to the luminance setting parameter value, where the algorithm logic includes a logic relationship among values of the first data 131, an amount of light incident to the pupils, and a luminance.

A specific algorithm is as follows: The pupil computing module 130 computes diameters R of corresponding pupils based on the obtained images of the eyes, converts the pupil diameters R into pupil areas, compares the pupil areas with an initial system value, and computes an amount L of incident light for the pupil areas. The initial system value is a pupil diameter R0 under luminance L0 (luminance of a white screen) of the display device. The initial system value is usually set under indoor ambient light, and is usually between 300 lux and 700 lux.

As can be learned from the foregoing, the amount of incident light for the pupil areas is $L=((R/R0)^2)*L0$. Furthermore, it is learned that $L/L0=(R/R0)^2$. The luminance of the display device may be adjusted according, to the proportion, to fix energy of the blue light entering the eyes.

In addition, the algorithm logic is not fixed, provided that the algorithm logic satisfies the condition required in this application.

In an embodiment, the processing module 140 is configured to find a luminance value corresponding to the first data 131 according to a luminance correspondence table, and adjust the luminance of the display panel according to the luminance value.

In an embodiment, when the first data 131 computed by the pupil computing module 130 is less than a specified value, a maintenance instruction is generated, and the processing module 140 controls, according to the maintenance instruction, the light emitting module 110 to maintain the luminance. Therefore, a system of the display device is not always in a blue light protection state. When the pupils are relatively small, original settings of the screen of the display device may be maintained. When, the pupils dilate gradually and sizes are less than a specified value, the display device still maintains original luminance, or when the pupils dilate gradually and sizes are greater than a specified value, the light emitting module 110 decreases the luminance of the display device. In addition, the specified value is not fixed, and may be adjusted according to an actual situation.

In an embodiment, when the first data 131 computed by the pupil computing module 130 is not less than a specified value and increases gradually, a first instruction is generated, and the processing module 140 controls, according to the first instruction, the light emitting module 110 to decrease the luminance. In addition, the specified value is not fixed, and may be adjusted according to an actual situation.

In an embodiment, when the first data 131 computed by the pupil computing module 130 is not less than a specified value and decreases gradually, a second instruction is generated, and the processing, module 140 controls, according to the second instruction, the light emitting module 110 to increase the luminance. When the first data 131 decreases gradually to the specified value, the light emitting module 110 no longer increases the luminance, and starts to maintain the luminance of the display device. In addition, the specified value is not fixed, and may be adjusted according to an actual situation.

Figure 2:
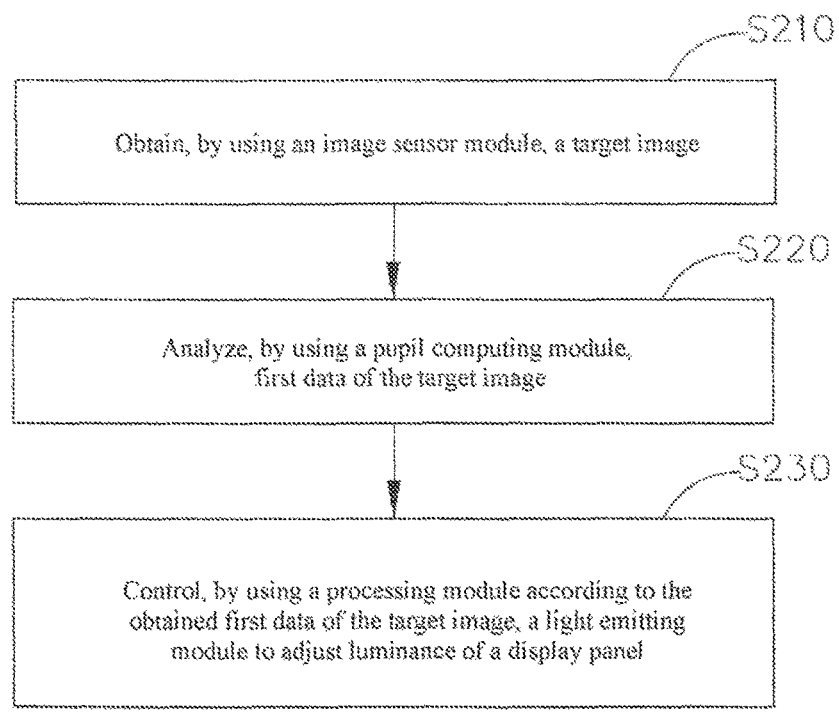
FIG. 2 is a schematic flowchart of a control method of a display device according to this application.

Referring to FIG. 2, FIG. 2 is a schematic flowchart of a control method of a display device according to this application. The method includes steps of.

Step S210. Obtain, by using an image sensor module, a target image.

Step S220. Analyze, by using a pupil computing module, first data of the target image.

Step S230. Control, by using a processing module according to the obtained first data of the target image, a light emitting module to adjust a luminance of a display panel.

In an embodiment, the method further includes: inputting, by using the processing module, the first data to an algorithm logic, to compute a luminance setting parameter value, and adjusting the luminance of the display panel according to the luminance setting parameter value, where the algorithm logic includes a logic relationship among values of the first data, an amount of light incident to the pupils, and a luminance.

In an embodiment, the method further includes: finding, by using the processing module, a luminance value corresponding to the first data according to a luminance correspondence table, and adjusting the luminance of the display panel according to the luminance value.

In an embodiment, the method further includes: when the first data computed by the pupil computing module is less than a specified value, generating a maintenance instruction, and controlling, by using the processing module according to the maintenance instruction, the light emitting module to maintain the luminance of the display panel. Therefore, a system of the display device is not always in a blue light protection state. When the pupils are relatively small, original settings of the screen of the display device may be maintained. When the pupils dilate gradually and sizes are less than a specified value, the display device still maintains original luminance, or when the pupils dilate gradually and sizes are greater than a specified value, the light emitting module decreases the luminance of the display device. In addition, the specified value is not fixed, and may be adjusted according to an actual situation.

In an embodiment, the method further includes: when the first data computed by the pupil computing module is not less than a specified value and increases gradually, generating a first instruction, and controlling, by using the processing module according to the first instruction, the light emitting module to decrease the luminance of the display panel. In addition, the specified value is not fixed, and may be adjusted according, to an actual situation.

In an embodiment, the method further includes: when the first data computed by the pupil computing module is not less than a specified value and decreases gradually, generating a second instruction, and controlling, by using the processing module according to the second instruction, the light emitting module to increase the luminance of the display panel. When the first data decreases gradually to the specified value, the light emitting module no longer increases the luminance, and starts to maintain the luminance of the display device. In addition, the specified value is not fixed, and may be adjusted according to an actual situation.

Figure 3A:
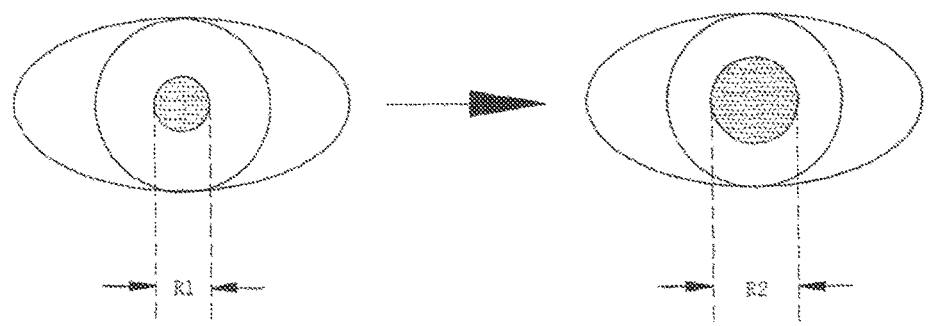
FIG. 3A and FIG. 3B are schematic diagrams of a display device and a control method of a display device according to this application.
Figure 3B:
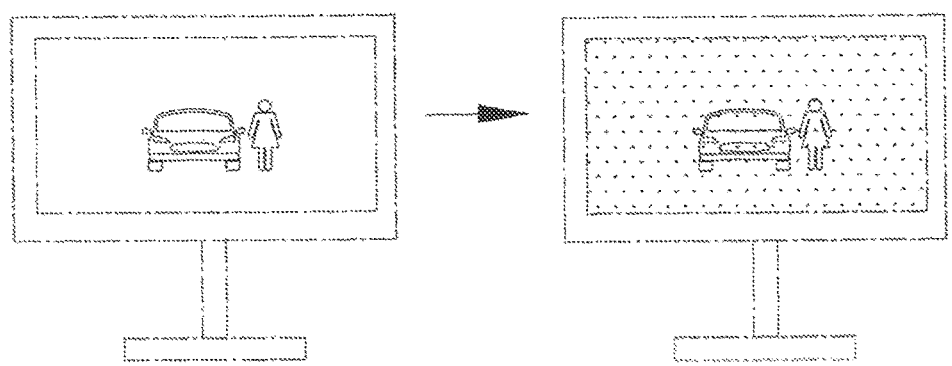

Referring to FIG. 3A and FIG. 3B, FIG. 3A and FIG. 3B are schematic diagrams of a display device and a control method thereof according to this application. Refer to FIG. 1 together.

In FIG. 3A, the image sensor module 120 in the display device obtains the target image, the pupil computing module 130 analyzes the first data 131 of the target image, when the first data 131 computed by the pupil computing module 130 is not less than a specified value and gradually increases from R1 to R2, a first instruction is generated, and the processing module 140 controls, according to the first instruction, the light emitting module 110 to decrease luminance of the display device.

In FIG. 3B, based on FIG. 3A, the luminance of the display device is decreased.

In an embodiment, the specified value is not fixed, and may be adjusted according to an actual situation.

In an embodiment, when the first data 131 computed by the pupil computing module 130 is not less than a specified value and decreases gradually, a second instruction is generated, and the processing module 140 controls, according to the second instruction, the light emitting module 110 to increase the luminance. When the first data 131 decreases gradually to the specified value, the light emitting module 110 no longer increases the luminance, and starts to maintain the luminance of the display device.

In an embodiment, when the first data 131 computed by the pupil computing module 130 is less than a specified value, a maintenance instruction is generated, and the processing module 140 controls, according to the maintenance instruction, the light emitting module 110 to maintain the luminance. Therefore, a system of the display device is not always in a blue light protection state. When the pupils are relatively small, original settings of the screen of the display device may be maintained. When the pupils dilate gradually and sizes are less than a specified value, the display device still maintains original luminance, or when the pupils dilate gradually and sizes are greater than a specified value, the light emitting module decreases the luminance of the display device.

In an embodiment, the display device in this application may be applied to a smart electronic display device such as a mobile phone, a monitor, a notebook computer, a Pad, a television, or a smart watch.

Figure 4:
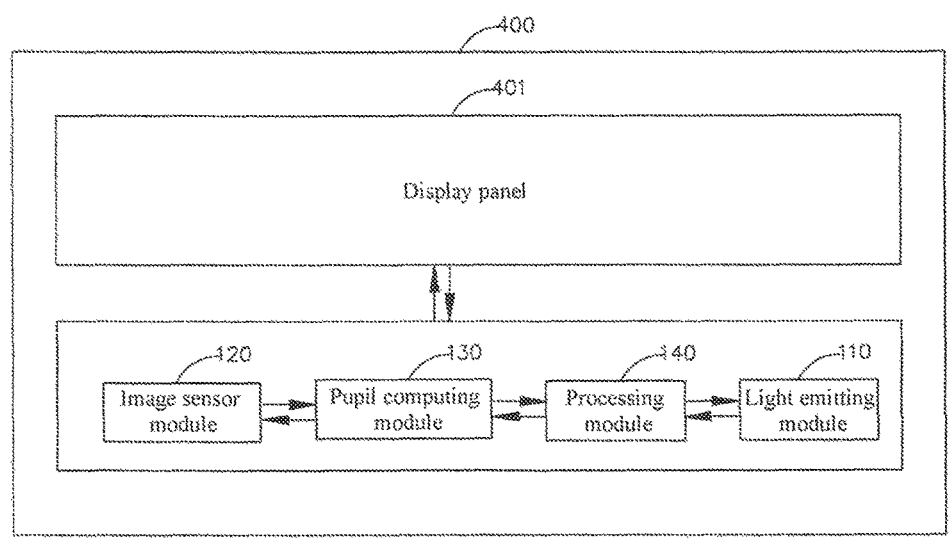
FIG. 4 is a schematic diagram of a display device according to this application.

Referring to FIG. 4, FIG. 4 is a schematic diagram of a display device according to this application. Refer to FIG. 1 together.

In FIG. 4, the display device 400 includes a display panel 401, a light emitting module 110, an image sensor module 120, a pupil computing module 130, and a processing module 140.

In an embodiment, the display panel may be a TN-type, an OCB-type, or a VA-type TFT liquid crystal display panel, but is not limited thereto. The display panel of the display device may be a liquid crystal display panel having a curved panel. The display panel may be, for example, an OLED display panel, a QLED display panel, a curved display panel, or another display panel.

In this application, pupil sizes of the eyes needing to be adjusted in different environments may be computed precisely by using an algorithm, so as to automatically adjust the luminance of the display device, thereby achieving an effect of protecting the eyes by reducing intensity of the blue light. At the same time, an entire display image is not yellowish even in lack of the color of the blue light, the color of the image can be maintained, quality of the display image is not affected, and user experience is improved.

The foregoing descriptions are merely preferred embodiments of this application, and are not intended to limit this application in any form. Although this application has been disclosed above through the preferred embodiments, the embodiments are not intended to limit this application. Any person skilled in the art can make some variations or modifications, namely, equivalent changes, according to the foregoing disclosed technical content to obtain equivalent embodiments without departing from the scope of the technical solutions of this application. Any simple amendment, equivalent change, or modification made to the foregoing embodiments according to the technical essence of this application without departing from the content of the technical solutions of this application shall fall within the scope of the technical solutions of this application.

What is claimed is:

1. A control method of a display device, comprising steps of:
   obtaining, by using an image sensor module, a target image;
   obtaining, by using a pupil computing module, first data of the target image; and
   controlling, by using a processing module according to the obtained first data of the target image, a light emitting module to control luminance of a display panel,
   wherein a step of the controlling, by using a processing module according to the obtained first data of the target image and a light emitting module to control luminance of a display panel, further comprises:
   inputting, by using the processing module, the first data to an algorithm logic, to compute a luminance setting parameter value, and control the luminance of the display panel according to the luminance setting parameter value1
   wherein the algorithm logic comprises a logic relationship among values of the first data, an amount of light incident to the pupils and luminance
   wherein the algorithm logic is $L=((R/R0)^2)*L0$, wherein L is the amount of light incident to the pupils, L0 is the luminance of a white screen as an initial system value, R and R0 is included in the first data,
   wherein R is a diameters of the pupil, R0 is a diameter of the pupil under luminance L0,
   wherein when the first data computed by the pupil computing module is less than a specified value, generating a maintenance instruction; and
   controlling, by using the processing module according to the maintenance instruction, the light emitting module to maintain the luminance of the display panel.

2. The control method of a display device according to claim 1, wherein a step of the controlling, by using a processing module according to the obtained first data of the target image, a light emitting module to control luminance of a display panel further comprises:
   finding, by using the processing module, a luminance value corresponding to the first data according to a luminance correspondence table, and controlling the luminance of the display panel according to the luminance value.

3. The control method of a display device according to claim 1, further comprising:
   when the first data computed by the pupil computing module is not less than a specified value and increases gradually, generating a maintenance instruction.

4. The control method of a display device according to claim 3, further comprising:
   controlling, by using the processing module according to the first instruction, the light emitting module to decrease the luminance of the display panel.

5. The control method of a display device according to claim 1, further comprising:
   when the first data computed by the pupil computing module is not less than a specified value and decreases gradually, generating a second instruction.

6. The control method of a display device according to claim 5, further comprising:
   controlling, by using the processing module according to the second instruction, the light emitting module to increase the luminance of the display panel.

* * * * *